United States Patent

Higuchi et al.

[15] 3,650,160
[45] Mar. 21, 1972

[54] DRIVING CONNECTION CONTROL SYSTEM

[72] Inventors: Toshio Higuchi, Suita-shi; Hideyuki Miyabe; Takeo Hiramatsu, both of Kyoto-shi, all of Japan

[73] Assignee: Mitsubishi Jidosha Kogyo Kabushiki Kaisha, Minato-ku, Tokyo, Japan

[22] Filed: Sept. 25, 1969

[21] Appl. No.: 860,864

[30] Foreign Application Priority Data

Sept. 28, 1968 Japan....................................43/69971

[52] U.S. Cl....................................74/752, 74/751, 74/868
[51] Int. Cl.....................F16h 5/42, F16h 3/74, B60k 21/10
[58] Field of Search....................................74/868, 752, 751

[56] References Cited

UNITED STATES PATENTS

| | | | |
|---|---|---|---|
| 2,946,241 | 7/1960 | Synder | 74/751 X |
| 3,230,792 | 1/1966 | Kelley et al. | 74/751 X |
| 3,251,245 | 5/1966 | Forster | 74/751 |
| 3,251,246 | 5/1966 | Forster et al. | 74/751 |
| 3,381,547 | 5/1968 | Forster et al. | 74/751 X |
| 2,896,478 | 7/1959 | Winchell | 74/868 X |
| 3,053,107 | 9/1962 | Winchell | 74/868 |

*Primary Examiner*—Arthur T. McKeon
*Attorney*—McGlew and Tuttle

[57] ABSTRACT

An automatic transmission comprises a hydraulic torque converter, a clutch unit and a planetary gear unit. The clutch unit is provided with a braking unit. Hydraulic pressure corresponding to the reaction torque of the braking unit is produced and used for engaging the braking unit.

7 Claims, 5 Drawing Figures

3,650,160

PATENTED MAR 21 1972

INVENTORS
TOSHIO HIGUCHI
HIDEYUKI MIYABE
TAKEO HIRAMATSU

BY McGlew and Toren
ATTORNEYS

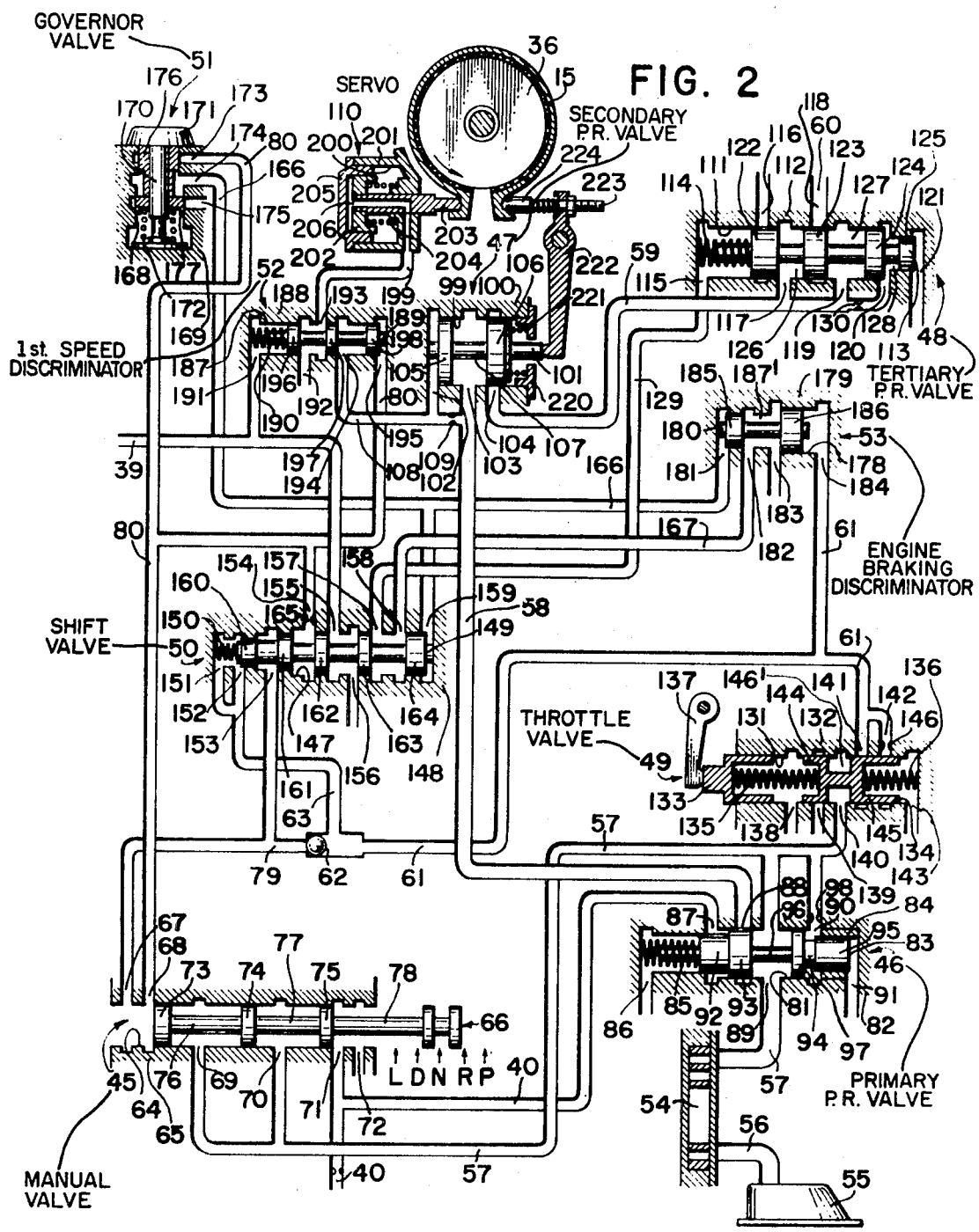

DRIVING CONNECTION CONTROL SYSTEM

BACKGROUND OF THE INVENTION

This invention relates to a system for controlling a driving connection between a driving shaft and a driven shaft, and more particularly to a hydraulic control system adapted for use with automatic transmissions for vehicles.

One conventional automatic transmission for vehicles has been so constructed that a hydraulic pressure (line pressure) supplied to the friction mechanism of the transmission is regulated in dependence upon the vehicle speed and the throttle opening. In another transmission, the hydraulic pressure is regulated in dependence upon the reaction torque of the stator of a torque converter. Accordingly, at a low vehicle speed and a large throttle opening, the line pressure applied to the friction mechanism, owing to a large torque to be transmitted, is in general selected higher, while either at a high vehicle speed or at a small throttle opening the line pressure is selected lower. This is due to the fact that, when the hydraulic pressure for gear change is higher than required, a large shock at gear change appears and the power loss in the oil pump become disadvantageously large.

In a conventional control system, the line pressure is kept nearly constant for a short period at gear change, and it is very difficult to time ideally the relief of hydraulic pressure from one friction mechanism and the supply of hydraulic pressure to the other friction mechanism. Therefore, a one way clutch is generally used in the first speed section of a forward three speed type transmission, so that at the gear change from the first speed to the second speed it is not necessary to relieve the hydraulic pressure from the friction mechanism and it is only necessary to control the building-up speed of hydraulic pressure for the friction mechanism corresponding to the second speed, thus making the control easy. On the contrary, the gear change from the second speed to the third speed and that from the third speed to the second speed, which are both carried out by means of the friction mechanism, are controlled with difficulty.

Particularly in a forward two speed type transmission, the provision of a one way clutch is disadvantageous because it increases the cost thereof almost to that of a three speed transmission. Accordingly both the first speed and the second speed must be established by the use of frictional mechanisms. Thus the timing for supplying the hydraulic pressure becomes difficult.

In a transmission having a torque converter and regulated in dependence upon the vehicle speed and the throttle opening, the line pressure must be raised up twice as high as the pressure in a usual high speed operation, because the increase in torque at a low vehicle speed is of considerable magnitude. For this purpose, a special consideration for the line pressure at a low speed is often given. For example, in order to increase the line pressure at a low speed the throttle pressure depending upon the throttle opening is applied to a pressure regulator valve and at the same time the re-regulated throttle pressure is applied again to the pressure regulator valve to raise the pressure while the action of this re-regulated pressure is interrupted at a high speed. The pressure may be raised by exerting the reaction torque of the stator of a torque converter upon the pressure regulator valve.

As described above, while the line pressure must be delicately changed in dependence upon the vehicle speed and the throttle opening, nevertheless its control in the conventional systems is not easy and requires additional valves.

SUMMARY OF THE INVENTION

The principal object of this invention is to solve the aforesaid problems of control of power transmission.

In accordance with the invention, a fixing friction mechanism is provided on an intermediate rotary member, in a transmission mechanism between a driving shaft and a driven shaft, in order to control a driving connection between both shafts. A hydraulic pressure corresponding to the reaction torque due to a fixing friction is used for engaging the friction mechanism in such a manner that it is raised with an increase of the torque in one direction of rotation to complete the engaging of the friction mechanism while it is held so low in the other direction of rotation as not to establish the engaging of the friction mechanism so that the engaging of the fixing friction mechanism is established only in a predetermined direction like in a one way clutch. Thus the shock at the time of gear change may be mitigated. By adoption of the mechanism according to the invention it may be impossible that a torque is transmitted from the driven shaft to the driving shaft at the time of engine braking. By provision of a drive discriminating device such as an engine braking discriminator valve which discriminates a driving relation between the driving shaft and the driven shaft, a hydraulic pressure which rises with increase of the vehicle speed independently of the torque transmitted may be produced by means of another pressure regulator valve at the time of engine braking and then supplied to the fixing friction mechanism for the engaging thereof. Thus the fixing friction mechanism operates as a one way clutch only during gear change.

BRIEF DESCRIPTION OF THE DRAWINGS

In the drawings:

FIG. 2 is a schematic view of a hydraulic control circuit capable of being used with the transmission of FIG. 1;

DESCRIPTION OF THE PREFERRED EMBODIMENT

Figure 1:
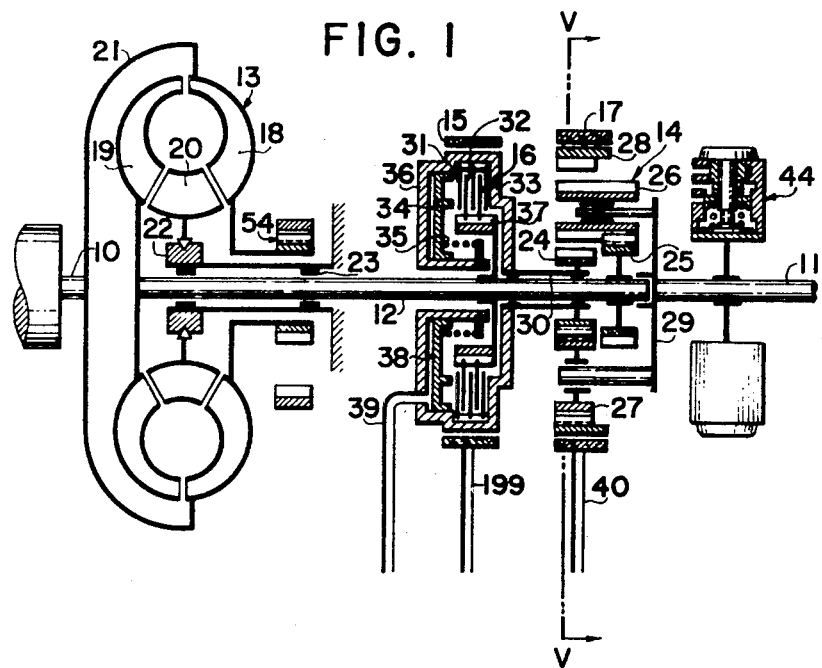
FIG. 1 shows in schematic form an automatic transmission embodying the present invention.
Figure 5:
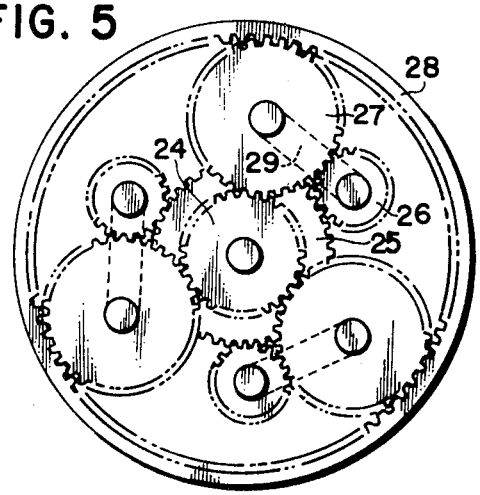
FIG. 5 is a cross-sectional view of the gear unit taken along line V—V of FIG. 1.

Referring now to FIGS. 1, 2 and 5 a transmission has a driving shaft (input shaft) 10, a driven shaft (output shaft) 11 and an intermediate shaft 12 arranged in alignment with one another. The transmission is composed of a hydraulic torque converter 13, a planetary gear unit (Ravigneaux-type) 14, a brake 15 for the first speed, a clutch 16 for the second speed, and a brake 17 for the backward speed. The torque converter 13 consists of an impeller with blades (pump) 18, a driven runner with blades (turbine) 19, and a reaction member with blades (stator) 20.

The pump 18 is connected to the driving shaft 10 by means of a converter casing 21, while the turbine 19 is connected to the intermediate shaft 12. The stator 20 is connected to a sleeve shaft 23 through a one way clutch 22, the sleeve shaft 23 being secured to the main body of the transmission as shown. The torque converter is of a conventional construction.

The planetary gear unit 14 is composed of a front sun gear 24, a rear sun gear 25, long pinions 26, short pinions 27, a ring gear 28, and planetary carriers 29. The front sun gear 24 is formed integral with a sleeve shaft 30 and meshes with short pinions 27, which in turn mesh with the long pinions 26 and the ring gear 28. The long pinions 26 mesh with the short pinions 27 and the rear sun gear 25. The rear sun gear 25, which is driven by the intermediate shaft 12, meshes with the long pinions 26.

The second speed clutch 16 arranged within a drum 36 consists of clutch plates 31, 32, a pressure plate 33, a piston 34, and a return spring 35. The clutch plates 31 are carried on the internally splined drum 36 while the clutch plates 32 are carried on a splined clutch hub 37. Accordingly, the turbine 19, the intermediate shaft 12, the clutch hub 37, the clutch plates 32 and the rear sun gear 25 rotate as one body, while the drum 36, the piston 34, the return spring 35, the clutch plates 31, the pressure plate 33, the sleeve shaft 30 and the front sun gear 24 also rotate as one body.

The piston 34, when a hydraulic pressure is applied to the cavity 38 of the drum 36 from a pressure line 39, engages, against the return spring 35, the clutch plates 31 with the clutch plates 32. When the hydraulic pressure is relieved from the cavity 38, the piston 34 is returned by the return spring 35 to disengage the clutch plates 31 from 32 from one another. When the clutch plates 31 frictionally engages the clutch plates 32, a direct driving connection is established between the intermediate shaft 12 and the sleeve shaft 30 so that the front sun gear 24, the rear sun gear 25, and thus the output shaft 11 rotate at the same speed. In this case the reduction ratio of the intermediate shaft 12 to the output shaft 11 is equal to 1.

The reverse brake 17, when applied with a hydraulic pressure from a pressure line 40, holds the ring gear 28 with the aid of a servo piston (not shown). In this instance, since the other brake and the clutch are released, the intermediate shaft 12 rotates in a direction opposite to the output shaft 11 so that the reduction ratio will be equal to $-1.82$.

The drum 36 and the first speed brake 15, as illustrated in FIG. 2, are viewed from the front side of the automatic transmission or from the torque converter side.

The first speed brake 15 brakes the drum 36, when a hydraulic pressure is applied to a cavity 206 of a servo unit 110 from a pressure line 199 to urge a piston 202 against the force of a return spring 204. The front sun gear 24 is then held stationary so that the reduction ratio of the intermediate shaft 12 to the output shaft becomes equal to 1.82.

The output shaft 11 may be connected to the driving wheels of a motor vehicle by a suitable means (not shown).

A governor 44 is secured to the output shaft 11 to rotate therewith, and is capable of producing a hydraulic pressure in accordance with the rotating speed thereof.

FIG. 2 illustrates a hydraulic control system for the automatic transmission shown in FIG. 1. This control system comprises the following valves:

| | |
|---|---|
| Manual valve | 45 |
| Primary pressure regulator valve | 46 |
| Secondary pressure regulator valve | 47 |
| Tertiary pressure regulator valve | 48 |
| Throttle valve | 49 |
| Shift valve | 50 |
| Governor valve | 51 |
| First speed discriminator valve | 52 |
| Engine braking discriminator valve | 53 |

Besides the above valves, the control system includes an oil pump 54 driven by the engine.

Oil from an oil sump (not shown), after being cleared of dust particles by means of an oil strainer 55, flows into the oil pump 54 through a line 56 and is then fed through a line 57 to the primary pressure regulator valve 46, the manual valve 45 and the throttle valve 49.

The primary pressure regulator valve 46 is connected through a line 58 to the secondary pressure regulator valve 47, which in turn is connected to the tertiary pressure regulator valve 48 through a line 59. The tertiary pressure regulator valve 48 is connected to parts to be lubricated, through a line 60, and to the torque converter 13.

The throttle valve 49 is connected to the engine braking discriminator valve 53 by a line 61 and also connected to the shift valve 50 through a check ball 62 and a line 63.

The shift valve 50 is connected to the cavity 38 of the second speed clutch 16 through a line 39 and also connected to the first speed discriminator valve 52.

The manual valve 45, which is used for selecting various driving conditions, consists of a cylindrical bore 64 in a casing 65 with a valve piston 66 movable in the cylindrical bore 64. The casing 65 is provided with ports 67, 68, 69, 70, 71 and 72, all of them opening to the bore 64. The valve piston 66 is formed with lands 73, 74 and 75, with has annular grooves 76, 77 and 78 therebetween. The ports 69 and 70 are connected to the line 57, the port 71 to the line 40, the port 67 to the line 79, and the port 68 to the line 80. The port 72 is an exhaust port connected to an oil sump of the transmission.

The valve piston 66 is capable of selectively taking any of five positions upon its axial movement to communicate the desired ports with each other in accordance with the selected position. The five positions are the position P, for parking and engine-starting, the position R, for reverse operation, the neutral position N, the automatic gear change position D between the first speed and the second speed, and the position L for the fixed first speed. The valve piston 66 as shown is in the neutral position N.

The primary pressure regulator valve 46 has the function of regulating the hydraulic pressure developed by the pump 54, and includes a casing 82 having a stepped cylindrical bore 81 formed therein, a valve piston 83, a valve plug 84 and a valve spring 85. The casing 82 is provided with ports 86, 87, 88, 89, 90 and 91, all of them opening to the bore 81. The valve piston 83 is formed with lands 92, 93, 94 and 95, and has annular grooves 96 and 97 between the last three lands. The ports 86, 91 are exhaust ports for the oil sump. The port 87 is connected to the line 40, the port 88 to the line 58, the port 89 to the line 57, and the port 90 to the line 57 through an orifice 98, respectively. The primary pressure regulator valve 46 acts only when the hydraulic pressure in the line 58 is lower than the regulated pressure regulated by this valve, and loses its function when the hydraulic pressure in the line 58 is higher than the regulated pressure. In the latter case, the hydraulic pressure in the line 57 or 58 will be regulated by the secondary pressure regulator valve 47 or the tertiary pressure regulator valve 48.

The pressure regulated by the primary pressure regulator valve 46 is set to, for instance, 5 kg./cm.$^2$ in forward operation and 12 kg./cm.$^2$ in reverse operation.

The secondary pressure regulator valve 47, which has the function of developing a hydraulic pressure corresponding to the torque generated in the drum 36 in a direction designated with an arrow, is composed of a casing 100 with a cylindrical bore 99 formed therein, a valve piston 101, a valve plug 220, a valve spring 221, a resiliently biased abutment member 224 and a lever 222 for transmitting the torque produced by the drum 36 and an adjusting screw 223. The casing 100 is provided with ports 102, 103 and 104, all of them opening to the bore 99. The valve piston 101 is formed with lands 105 and 106, and has an annular groove 107 therebetween. The port 102 is connected to a line 108, the port 103 to the line 58, and the port 104 to the line 59. The line 108 is connected to the line 58 through an orifice 109. The pressure regulated by the valve 47 amounts to a value corresponding to the torque produced by the drum 36 only when the regulated pressure is higher than the pressure of the line 59 regulated by the tertiary pressure regulator valve 48, while the pressure in the lines 58 or 108 will be equal to the pressure regulated by the tertiary pressure regulator valve 48 when the regulated pressure of the valve 47 is lower than the pressure regulated by the tertiary pressure regulator valve 48.

The tertiary pressure regulator valve 48 is provided for the purpose of maintaining the hydraulic pressure applied to the servo unit 110 higher than the regulated pressure of the secondary pressure regulator valve 47 to establish the frictional engagement of the first speed brake 15 at engine braking and for feeding the oil to the torque converter 13 as well as to the parts to be lubricated. The valve 48 is composed of a casing 112 with a stepped cylindrical bore 111 formed therein, a valve piston 113 and a valve spring 114. The casing 112 is provided with ports 115, 116, 117, 118, 119, 120, and 121, all of them opening to the bore 111. The piston 113 is formed with lands 122, 123, 124 and 125, and has annular grooves 126, 127 and 128 therebetween. The ports 116 and 121 are exhaust ports for the oil sump. The port 115 is connected to a line 129, the ports 117 and 119 to the line 59, the port 118 to the line 60, and the port 120 to the line 59 through an orifice 130, respectively. The line 60 is an oil feeding pipe to the torque converter 13 and the parts to be lubricated.

The throttle valve 49, which has the function of producing a hydraulic pressure corresponding to the throttle opening of the engine, is used for determination of the gear change pattern between the first speed and the second speed and for discrimination of engine braking. This valve 49 is composed of a casing 132 with a stepped cylindrical bore 131 formed therein, valve pistons 133, 134, valve springs 135, 136 and a lever 137. The casing 132 is provided with ports 138, 139, 140, 141, 142 and 143, all of which open to the bore 131.

The piston 133 makes a displacement in dependance upon the throttle opening through the lever 137. The valve piston 134 is formed with lands 144 and 145, and has an annular groove 146' therebetween. The valve spring 135 is disposed between the piston 133 and the valve piston 134. The ports 138, 139 and 143 are oil discharge ports. The port 140 is connected to the line 57, the port 141 to the line 61, and the port 142 to the line 61 through an orifice 146. The higher of the pressures in the line 61, and in the line 79 while urging away the check ball 62, communicates with the line 63.

The shift valve 50 has the function of performing gear change between the first speed and the second speed in dependence upon the vehicle speed and the throttle opening, but in the low range L the gear is fixed at the first speed. This valve is composed of a casing 148 with a stepped cylindrical bore 147 formed therein, a valve piston 149 and a valve spring 150. The casing 148 is provided with ports 151, 152, 153, 154, 155, 156, 157, 158 and 159, all of which open to the bore 147. The piston 149 is formed with lands 160, 161, 162, 163 and 164, and has annular grooves between the respective lands as shown. The ports 151 and 152 are connected to the line 63, the port 153 to the line 79, the port 154 to the line 80 through an orifice 165, the port 155 to the line 39, the port 157 to the line 129, the port 158 to the line 167, and the port 159 to the line 166. The port 156 is an oil discharge port for the oil sump. The shift valve 50 shown is in a position for the first speed, and it, when moved leftwards, takes a position for the second speed.

The governor valve 51, which rotates together with the output shaft 11, has the function of producing a hydraulic pressure corresponding to the angular velocity of output shaft 11, or the vehicle speed, due to a centrifugal force. This valve is composed of a casing 169 with a stepped cylindrical bore 168 formed therein, a valve piston 170, a weight 171 and a valve spring 172. The casing is provided with ports 173, 174 and 175, all of which open to the bore 168. The piston 170 is formed with lands 176 and 177, and has an annular groove therebetween. The port 173 is connected to the line 80 and the port 174 to the line 166. The port 175 is an oil discharge port for the oil sump. A governor pressure produced by the governor valve 51 is applied to the shift valve 50 and the engine braking discriminator valve 53. At engine braking, the line 166 is connected to the line 167, and, in case of the first speed, the line 167 is connected to the line 129, whereby the regulated pressure in the tertiary pressure regulator valve 48 increases with increase of the vehicle speed.

The engine braking discriminator valve 53 has the function of deciding whether the engine braking is being applied or not by opposing the throttle pressure to the governor pressure. This valve is composed of a casing 179 with a stepped cylindrical bore 178 formed therein and a valve piston 180. The casing 179 is provided with ports 181, 182, 183 and 184, all of which open to the bore 178. The piston 180 is formed with lands 185 and 186, and has an annular groove 187' therebetween. The port 182 is connected to line 167, the port 181 to the line 166, and the port 184 to the line 61. The port 183 is an exhaust port for the oil sump. In the state shown the engine is running, and, if the piston 180 is moved rightwards, the valve comes into the engine braking range.

A first speed discriminator valve 52 has the function of completely releasing the first speed brake 15 in N, R and P ranges, of establishing a hydraulic connection to the servo 110 so that the pressure regulated by the secondary pressure regulator valve 47 may be applied to the servo 110 at the first speed in D and L ranges and of relieving the pressure of the servo 110 to prevent the dragging of the first speed brake when the shift valve 50 is in the position corresponding to the second speed so that the hydraulic pressure for the second speed clutch increases to a certain extent. The first speed discriminator valve 52 is composed of a casing 188 with a cylindrical bore 187 formed therein, a valve piston 189 and a valve spring 190. The casing is provided with ports 191, 192, 193, 194 and 195, all of which open to the bore 187. The piston is formed with lands 196, 197 and 198, and has annular grooves between the lands. The port 191 is connected to the line 39, the port 193 to the line 199, the port 194 to the line 108, and the port 195 to the line 80. The port 192 is an exhaust port for the oil sump.

The servo 110, which has the function of engaging and releasing the first speed brake 15, is composed of a casing 201 with a cylindrical bore 200 formed therein, a piston 202, a push rod 203, a return spring 204 and a cover 205. The cavity 206 is applied with a hydraulic pressure from the line 199.

The device constructed above operates as follows:

The engine is started in the state that the manual valve 45 is positioned in P position or N position as shown in the drawing. The oil pump 54 is driven with engine running, and oil, after being cleared of dust by the oil strainer 55, is supplied to the oil pump 54 through the line 56. The oil from the pump is supplied to the ports 89 and 90 of the primary pressure regulator valve 46, the port 140 of the throttle valve 49, and the ports 69 and 70 of the manual valve 45 through the line 57. The piston 83 is moved leftwards by a force produced by the difference between the pressures acting on the lands 94 and 95 of piston 83 of the primary pressure regulator valve 46 against the force of the spring 85. With the leftward movement of the piston 83, the port 88 opens to the line 58 so that the oil flows into the port 103 of the secondary pressure regulator valve 47. When the land 93 to the line 58 is opened, the hydraulic pressure of the line 57 decreases, and is regulated until the force of the spring 85 is balanced with the pressure due to the differential area between the lands 94 and 95.

Similarly, pressure regulation is carried out in the secondary pressure regulator valve 47, and the pressure oil thus regulated is supplied to the ports 117, 119, and 120 of the tertiary pressure regulator valve 48. Here, the pressure also is regulated until the hydraulic pressure acting on the differential area between the lands 124 and 125 is balanced with the force of the spring 114.

Figure 3:
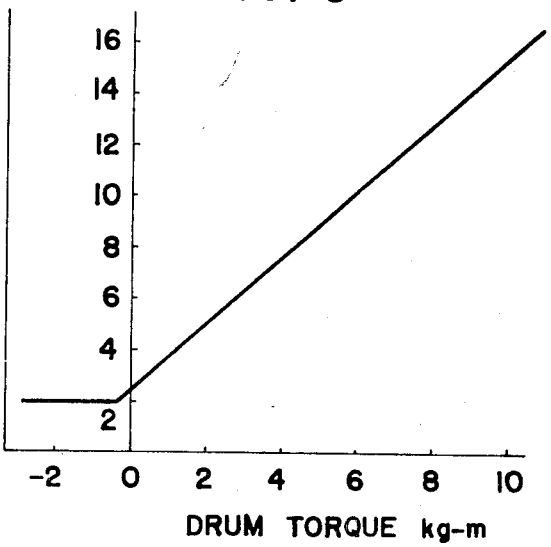
FIG. 3 is a graph showing the relation between the regulating pressure and the torque of the transmission.
Figure 4:
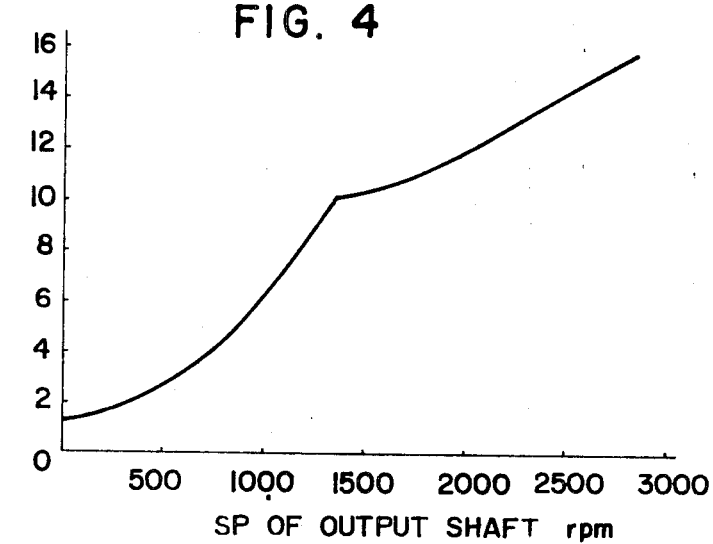
FIG. 4 is a graph showing the relation between the regulating pressure and the speed of the output shaft.

The pressure regulated in the primary pressure regulator valve 46 is kept at 5 kg./cm.$^2$ in the ranges other than the reverse R range in which it has a value of 12 kg./cm.$^2$. In the secondary pressure regulator valve 47 there appears a hydraulic pressure due to the torque of drum 36 at the first speed, but the pressure is kept at a constant valve of 2 kg./cm.$^2$ in other conditions. FIG. 3 shows the variation of regulator pressure in the secondary pressure regulator valve 47. When engine braking discriminator valve 53 is moved to the right by the increase of governor pressure, and the apparatus determines that the vehicle speed is within the limits of engine braking, and also when the total of the forces of valve spring 150 and the fluid pressure acting to the right is larger than the force acting to the left, due to governor pressure, and the shift valve 50 is maintained in the right-hand position, in the state of the first speed, governor pressure from port 174 is applied to port 115 of tertiary pressure regulator valve 48 through lines 166, 167 and 129. Thus, the tertiary regulator pressure is increased with an increase in the vehicle speed. FIG. 4 shows the variation of regulated pressure in the tertiary pressure regulator valve 48.

When the manual valve 45 is set for D position, the oil pressure regulated by the primary pressure regulator valve 46 enters into the port 69 and is supplied from the port 68 to the governor valve 51, the shift valve 50 and the first speed discriminator valve 52 through the line 80. As the governor pressure rises with increase of the vehicle speed, the shift valve piston 149 moves leftwards thus to establish the second speed condition. Then, the hydraulic pressure regulated by the primary pressure regulator valve is fed to the line 39. When the pressure in the line 39 sufficiently rises, the first discriminator valve 52 moves rightwards thereby to entirely relieve the hydraulic pressure of the servo 110.

Since the response of a hydraulic pressure at the time of gear change is sufficiently quick with respect to the torque variation of the drum 36, there occurs only a small resistance when the drum 36 begins to rotate clockwise in the drawing after the clutch 16 has been applied. Accordingly, the device performs the function of a one way clutch. At the kick down at which the accelerator pedal is depressed deeply in the second speed condition so that the throttle pressure is greatly increased, the line 61 receives a pressure equal to the primary regulator pressure, whereby the down shift from the second speed to the first speed may be carried out below a certain vehicle speed. Since the port 155 of the shift valve 50 communicates with the port 156, the clutch pressure of the line 39 then suddenly decreases so that the first speed discriminator valve 52 moves leftwards to connect the port 194 with port 193 thereby supplying a hydraulic pressure to the cavity 206 of the servo 110 through the line 199. On the other hand, since the drum 36 is rotating clockwise, the torque becomes negative, and, as is clear from FIG. 3, the secondary regulator pressure rises only up to 2 kg./cm$^2$. Therefore, dragging due to the brake 15 may be minimized to zero. When the engine speed increases to raise the angular velocity of the intermediate shaft 12 so that the driving relation between respective gears in the planetary gear unit 14 establishes the first speed condition and the drum 36 begins to rotate in the direction denoted with arrow, the secondary regulator pressure suddenly increases to hold the drum 36 stationary. As the servo 110 is so designed that the force of return spring 204 may be balanced with the that of the piston 202 at a secondary regulator pressure of 2 kg./cm.$^2$, no dragging torque appears so long as the drum 36 is rotating.

When the manual valve 45 is set for L position, the ports 67, 68 and 69 are communicated with one another so that the primary regulator pressure is applied to the line 79 in addition to the case of D position. Then, the piston 149 of the shift valve 50 occupies the rightmost position to maintain the first speed condition. Further, when the manual valve 45 is set for L position during high speed running as far as it is in the range of engine braking, the tertiary pressure rises so high, as shown in FIG. 4, by the action of the engine braking discriminator valve 53, that the secondary pressure and primary pressure become equal to the tertiary pressure and also the hydraulic pressure in the cavity 206 of the servo 110 also increases. Consequently gear change may be quickly performed. In the range other than the engine braking range, the same condition as kickdown in D position is obtained.

When the manual valve 45 is set in R position, the port 70 is communicated with the port 71 to feed a hydraulic pressure to the port 87 of the primary pressure regulator valve 46 through the line 40. The primary regulator pressure rises higher due to the differential area between the lands 92 and 93, and remains at a value of about 12 kg./cm.$^2$. This primary regulator pressure is supplied to the servo (not shown) of the reverse brake 17 (FIG. 1) to hold the brake 17 stationary.

As has been explained, according to the present invention, in the transmission between the driving shaft and the driven shaft an optimum and accurate control can be performed, and the shock at the time of gear change is largely mitigated so that a comfortable feeling of gear change may be obtained. Moreover, owing to provision of a drive discriminating device in connection with transmission control, a very quick response for the gear change to the low speed at engine braking is obtained whereby defects in engine braking which have so far been considered as one of serious problems in conventional transmissions can be eliminated.

While the form of the control system herein described constitutes a preferred embodiment of the invention, it is to be understood that the invention is not limited to this embodiment, and that changes may be made without departing from the scope of the invention which is defined in the appended claims. For instance, instead of the brake band as a fixing friction mechanism a clutch may be employed. The present invention may be applied not only to automatic transmissions of vehicles but also to hydraulic equipment provided with a hydraulic one way clutch mechanism.

What is claimed is:

1. In a transmission mechanism including a driving shaft, a driven shaft, and change speed gearing interconnecting the shafts, the improvement comprising, in combination, said gearing including rotatable members controlling the speed ratios between said driving and driven shafts; respective friction means selectively engageable with said members to arrest rotation thereof to select said speed ratios; a source of hydraulic fluid under pressure; respective hydraulic actuators connected to said source to control engagement of the associated friction means with the respective rotatable members to effect gear changes; at least a first member of said rotatable members exerting a reaction torque on its associated first friction means only when rotating in a first direction, and exerting substantially no reaction torque on said first friction means when rotating in the opposite direction; a control valve regulating the pressure supplied from said source to the hydraulic actuator of said first friction means, and normally maintaining such regulated pressure at a relatively low preliminary value; and means operatively connecting said first friction means to said control valve and operable, responsive to exertion of a reaction torque on said first friction means, to adjust said control valve in correspondence with the magnitude of such reaction torque to supply, to the hydraulic actuator of said first friction means, a regulated pressure adjusted in direct proportion to the magnitude of such reaction torque to obtain full frictional engagement of said first friction means with said first rotatable member to arrest rotation of the latter; said first rotatable member having a free-wheeling operation when rotating in such opposite direction.

2. In a transmission mechanism, the improvement claimed in claim 1, in which said first rotatable member is a drum and said first friction means is a brake band engageable with said drum; said brake band having one end connected to its associated hydraulic actuator and its other end connected to an abutment included in said means operatively connecting said first friction means to said control valve.

3. In a transmission mechanism, the improvement claimed in claim 1, in which said means operatively connecting said first friction means to said control valve further includes a pivoted lever having one end engaged with said abutment and its opposite end engaged with a position adjusting element of said control valve.

4. In a transmission mechanism, the improvement claimed in claim 1, including an engine braking discriminating unit operable responsive to changes in the direction of torque transmission between said driving and driven shafts; means connecting said engine braking discriminating unit to said source and in controlling relation with said control valve; said engine braking discriminating unit, responsive to detection of engine braking, adjusting said control valve to supply, to the hydraulic actuator of said first friction means, a greatly increased regulated pressure.

5. In a transmission mechanism, the improvement claimed in claim 4, including means operatively associated with said engine braking discriminating unit and said control valve and operable to increase the pressure regulated by said control valve in substantial correspondence with an increase in the speed of said driven shaft.

6. In a transmission mechanism, the improvement claimed in claim 5, in which said last-named means is a governor valve connected to said driven shaft.

7. In a transmission mechanism including a driving shaft, a driven shaft, and change speed gearing interconnecting the shafts, the improvement comprising, in combination, said gearing including rotatable members controlling the speed ratios between said driving and driven shafts; respective friction means selectively engageable with said members to arrest rotation thereof to select said speed ratios; a source of hydraulic fluid under pressure; respective hydraulic actuators connected to said source to control engagement of the associated friction means with the respective rotatable members to effect gear changes; at least a first member of said rotatable members exerting a reaction torque on its associated first friction means only when rotating in a first direction, and exerting substantially no reaction torque on said first friction means when rotating in the opposite direction; a control valve regulating the pressure supplied from said source to the hydraulic actuator of said first friction means, and normally maintaining such regulated pressure at a relatively low preliminary value; means operatively connecting said first friction means to said control valve and operable, responsive to exertion of a reaction torque on said first friction means, to adjust said control valve to supply, to the hydraulic actuator of said first friction means, an increased regulated pressure substantially proportional to such reaction torque to obtain full frictional engagement of said first friction means with said first rotatable member to arrest rotation of the latter; said first rotatable member having a free-wheeling operation when rotating in such opposite direction; a primary pressure regulating valve connected to said source; said control valve comprising a secondary pressure regulating valve connected to said primary pressure regulating valve; and a tertiary pressure regulating valve connected in controlling relation to said secondary pressure regulating valve.

* * * * *